April 1, 1924.  
C. KINSLEY  
SPACE TELEGRAPH RECEIVING SYSTEM  
Original Filed March 29, 1920
1,488,791
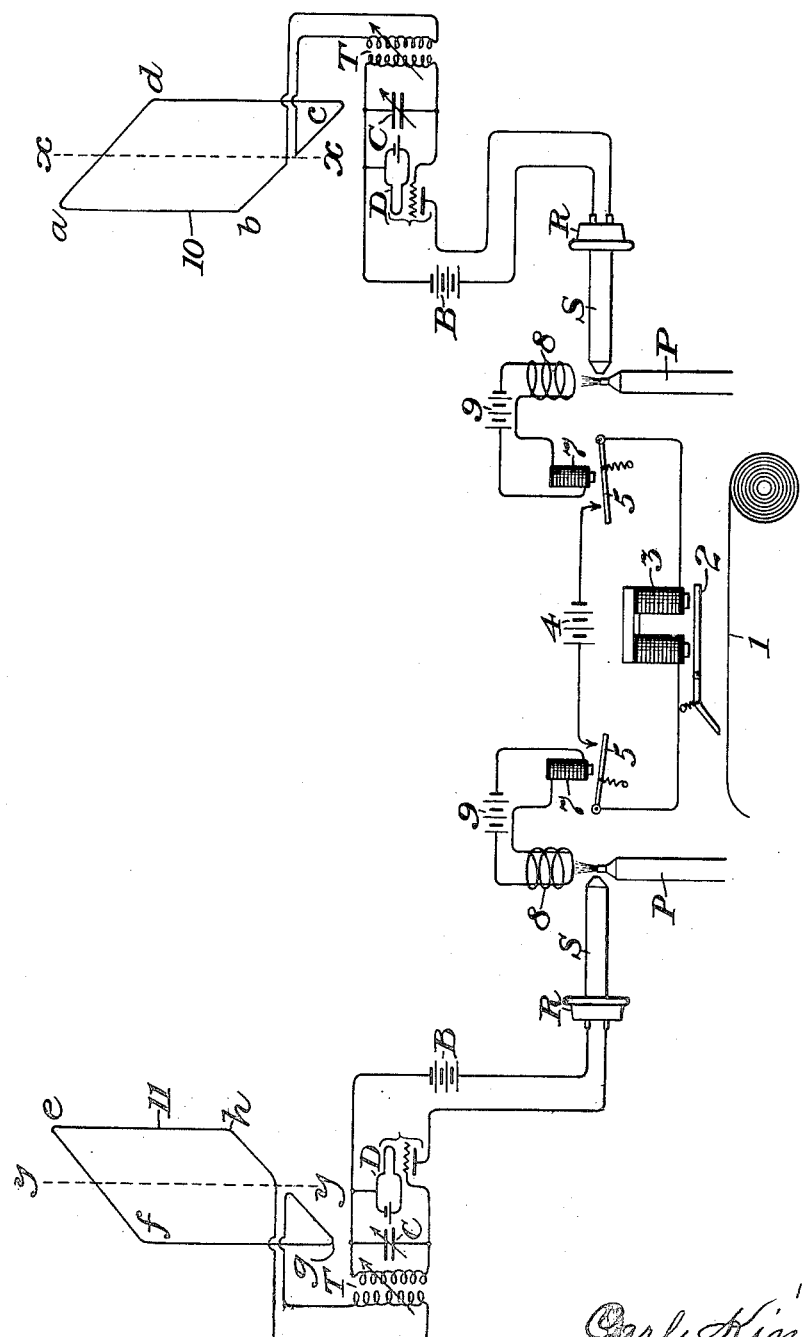
INVENTOR  
Carl Kinsley  
BY  
HIS ATTORNEY Patented Apr. 1, 1924.

1,488,791

UNITED STATES PATENT OFFICE.

CARL KINSLEY, OF NEW YORK, N. Y.

SPACE-TELEGRAPH RECEIVING SYSTEM.

Application filed March 29, 1920. Serial No. 369,618. Renewed August 25, 1923.

*To all whom it may concern:*

Be it known that I, CARL KINSLEY, a citizen of the United States, and resident of New York city, in the county of New York and State of New York, have invented certain new and useful Improvements in Space-Telegraph Receiving Systems, of which the following is a specification.

My present invention relates to receiving systems of the type in which the effects of natural electrical disturbances, (variously termed "static", "strays", etc.) are avoided and particularly to systems such as are set forth in the application of Ray E. Hall, Serial No. 317,119, filed August 13th, 1919. Hall's systems are characterized by a plurality of separate wave receiving elements or collecting wires, which are arranged in operative receiving relation to the same signal sending station but which, because they are separate, are differently affected by electrical disturbances. The energies thus separately received in a plurality of wave receiving elements are separately utilized to control the operation of a single indicator circuit so that the indicator in said circuit is actuated only at times when all of said wave receiving elements are energized. The effects of the strays in several receiving elements, are seldom synchronous enough to produce any effect on the indicator.

For best results the action of the incoming signal waves on each of the receiving elements should be approximately the same while the action of the strays should be as different as possible.

There is of course no particular difficulty about arranging any desired number of receiving wires so that they will be effectively energized from the same sending station and my invention relates more particularly to arranging the several receiving wires so that they will be affected as differently as possible by the strays. In this connection I utilize the discovery that strays are, at any particular time, markedly directional in their propagation. Hence an important feature of my invention consists in employing receiving elements which have directionally selective qualities, as for instance, those of the well known loop receiver type; and arranging them so that they will be effectively energized by waves from the direction of the sending station but will be less affected by strays or other disturbances propagated from other directions.

A further feature of my invention depends upon the fact that loop receivers may be arranged to receive effectively from the same sending station when disposed in different planes; and that when so disposed the strays received in the two loops are not the same. This makes possible various arrangements of separate receiving loops whereby both loops will be effectively energized by the radio signals but differently energized by the strays. For instance under certain conditions one loop may be arranged with its axis vertical and its plane presented edgewise toward the sending station, while the other loop has its axis horizontal, at right angles to the sending station and its plane also horizontal and therefore at right angles to the plane of the vertical loop. Thus strays coming from any direction produce effects as dissimilar as possible in the two loops. This will be true even where the loops are located at the same receiving station and subject to substantially the same atmospheric and other causes of electrical disturbances but obviously the receiving loops may be remote from one another yet associated with a single indicating circuit as explained in said Hall application. This is an improvement over ordinary receiving antennæ which have no directionally selective qualities.

In the accompanying drawings the figure is a diagrammatic view indicating a receiving system employing directionally selective loops in accordance with my present invention.

In these drawings the receiving indicator may be a recorder with a continuously moving tape 1, for contact of pivoted stylus 2 when magnet 3 is energized. This magnet is connected in series with battery 4 through two switches 5, 5. These switches are operated independently of each other by two separate wireless receiving systems having separate receiving elements operating on the principle set forth in the Hall application above referred to. Whatever system is used there will be electro-magnets 7, 7 or equivalent devices operating to close the switches for the duration of a received signal element and permitting automatic opening of the same when no signal energy is being received.

It will be understood that the so-called "static," "strays" or other electrical disturbances can operate to close both switches and produce a false indication, but only, if and when said disturbances effectively energize both receiving systems simultaneously. It is in this connection that the arrangement of loop receiving wires in accordance with my present invention is of peculiar importance.

The right hand receiving system is shown as having loop 10 arranged with its axis $x$—$x$, vertical and its plane $a, b, c, d,$ edgewise toward the sending station.

The left hand loop 11, has its axis $y$—$y$ vertical, at right angles to the direction of the sending station and its plane $e, f, g, h,$ at an angle to the plane of loop 10.

In practice one or both of the loops may be universally mounted so that they can be oriented in any desired direction for the purpose of adjusting them for effective and, if desired, approximately equal energization by waves from the sending station. On the other hand, static and similar disturbances, particularly those having directional propagation, will affect the two loops differently; and simultaneous energization of both loops to an extent sufficient to simultaneously close both switches 5, 5 will seldom occur.

As shown in the drawings, the receiving units for operating the switches 5, 5, each includes an adjustable transformer T, energizing a local circuit containing tuning condenser C operatively related to an amplifying device, in this case diagrammatically indicated as a vacuum tube or audion D, operating to produce magnified fluctuations of the current of battery B when the amplifier is energized by the received signal waves. The resulting fluctuations of current from battery B vibrate the diaphragm of a telephone receiver R, provided with a resonator S extending close to and on a level with the orifice of pipe P, through which air is continuously discharged under slight pressure. The form of the orifice and the pressure of the air is predetermined in accordance with principles well known in the art so as to make the jet sensitive to the frequency of the vibration of the diaphragm by the battery fluctuations so that the jet will break or bush on each acoustic impulse but will be self restoring between impulses.

The break or bushing of the jet is utilized in any desired way to control the operation of switch 5. As shown in the drawings, this is accomplished by means described in Hall application Serial No. 301,010, filed May 31st, 1919, and issued as Patent No. 1,378,345, dated May 17, 1921, which may be briefly described as comprising a hollow coil of extremely fine wire 8 normally heated to high temperature by flow of current from battery 9. This coil 8 is arranged with its axis in alignment with the jet so that the normal unbroken jet flows through the same without having much cooling effect on the wire but when the jet bushes, the cooling air impinges on the wire and cools the same thereby lowering its resistance and permitting increased flow of current from a battery. Such increase of current flow will increase the magnetism of coil 7 sufficiently to close switch 5. When the sensitive jet resumes its unbroken cylindrical form upon cessation of the impulses representing a signal element, the fine wire 8 is instantly reheated to its high resistance condition by flow of current from the battery, thereby automatically decreasing the flow of such current to a minimum, thereby de-energizing magnet 7 to permit switch 5 to re-open. Obviously both switches 5 must be closed in order to energize magnet 3 and operate recording stylus 2 to produce the desired indication.

As before explained, the signal waves will always produce this result where the receiving loops are adjusted for receiving from the same sending station, but strays or other directionally propagated disturbances, will seldom be able to energize both systems, synchronously and powerfully enough to close both switches 5, 5.

By increasing the number of switches 5, 5 and the corresponding receiving elements for controlling the same, and by widely separating the several receiving loops, the possibility of disturbance may be practically eliminated.

I claim:

1. A radio receiving system comprising an indicator circuit, a plurality of separate means for controlling said circuit, each including a wave receiving element and means for translating the received waves to operate a circuit controlling means, all of said receiving elements being designed and arranged to be effectively energized by waves from the same sending station and at least one of said receiving elements being directionally selective for the purpose described.

2. A radio receiving system comprising an indicator circuit, a plurality of separate means for controlling said circuit, each including a wave receiving element and means for translating the received waves to operate a circuit controlling means, all of said receiving elements being designed and arranged to be effectively energized by waves from the same sending station and at least one of said receiving elements being a loop receiver.

3. A radio receiving system comprising an indicator circuit, a plurality of separate means for controlling said circuit, each including a wave receiving element and means for translating the received waves to operate a circuit controlling means, all of said receiving elements being designed and arranged to be effectively energized by waves from the same sending station and at least two of said receiving elements being directionally selective and being differently disposed so as to be differently affected by electrical impulses propagated from directions other than that of the sending station.

4. A radio receiving system comprising an indicator circuit, a plurality of separate means for controlling said circuit, each including a wave receiving element and means for translating the received waves to operate a circuit controlling means, all of said receiving elements being designed and arranged to be effectively energized by waves from the same sending station and at least two of said receiving elements being separate loop receivers each adjusted for receiving waves from the same sending station.

5. A radio receiving system comprising an indicator circuit, a plurality of separate means for controlling said circuit, each including a wave receiving element and means for translating the received waves to operate a circuit controlling means, all of said receiving elements being designed and arranged to be effectively energized by waves from the same sending station and at least two of said receiving elements being separate loop receivers each adjusted for receiving waves from the same sending station, one receiving loop having its plane at an angle to the plane of another receiving loop for the purpose described.

6. A radio receiving system comprising an indicator circuit, a plurality of separate means for controlling said circuit, each including a wave receiving element and means for translating the received waves to operate a circuit controlling means, all of said receiving elements being designed and arranged to be effectively energized by waves from the same sending station and at least two of said receiving elements being separate loop receivers each adjusted for receiving waves from the same sending station, one receiving loop being vertical and another receiving loop being at an angle to said vertical loop for the purpose described.

Signed at New York city, in the county of New York and State of New York, this 5th day of March, A. D. 1920.

CARL KINSLEY.